(12) United States Patent
Mazany

(10) Patent No.: US 9,790,133 B2
(45) Date of Patent: Oct. 17, 2017

(54) MULTIPHASE COMPOSITIONS FOR OXIDATION PROTECTION OF COMPOSITE ARTICLES

(71) Applicant: GOODRICH CORPORATION, Charlotte, NC (US)

(72) Inventor: Anthony M. Mazany, Amelia Island, FL (US)

(73) Assignee: GOODRICH CORPORATION, Charlotte, NC (US)

( * ) Notice: Subject to any disclaimer, the term of this patent is extended or adjusted under 35 U.S.C. 154(b) by 138 days.

(21) Appl. No.: 14/671,430

(22) Filed: Mar. 27, 2015

(65) Prior Publication Data

US 2016/0280612 A1 Sep. 29, 2016

(51) Int. Cl.
| | |
|---|---|
| B05D 5/00 | (2006.01) |
| C04B 41/50 | (2006.01) |
| C04B 41/86 | (2006.01) |
| C04B 41/89 | (2006.01) |
| C04B 41/00 | (2006.01) |
| C04B 41/52 | (2006.01) |
| F16D 69/02 | (2006.01) |
| C03C 3/16 | (2006.01) |
| C03C 8/08 | (2006.01) |
| C03C 8/14 | (2006.01) |
| C03C 8/22 | (2006.01) |
| B05D 3/02 | (2006.01) |
| B05D 3/10 | (2006.01) |

(52) U.S. Cl.
CPC ........ *C04B 41/5022* (2013.01); *B05D 3/0254* (2013.01); *B05D 3/104* (2013.01); *B05D 5/00* (2013.01); *C03C 3/16* (2013.01); *C03C 8/08* (2013.01); *C03C 8/14* (2013.01); *C03C 8/22* (2013.01); *C04B 41/009* (2013.01); *C04B 41/52* (2013.01); *C04B 41/86* (2013.01); *C04B 41/89* (2013.01); *F16D 69/023* (2013.01); *F16D 2200/0047* (2013.01); *F16D 2250/0046* (2013.01)

(58) Field of Classification Search
CPC .... C03C 8/02; C03C 8/16; C03C 8/22; C04B 41/5022; B05D 3/104; F16D 69/023
See application file for complete search history.

(56) References Cited

U.S. PATENT DOCUMENTS

| | | | | |
|---|---|---|---|---|
| 3,961,114 | A | * 6/1976 | Berkenblit | C03B 19/00 428/34 |
| 2002/0096407 | A1 | * 7/2002 | Gray | C04B 41/009 188/251 R |
| 2007/0154712 | A1 | 7/2007 | Mazany | |
| 2010/0266770 | A1 | * 10/2010 | Mazany | C04B 41/009 427/309 |

FOREIGN PATENT DOCUMENTS

| | | |
|---|---|---|
| EP | 2767529 | 8/2014 |
| WO | 0051950 | 9/2000 |

OTHER PUBLICATIONS

Extended European Search Report dated Jul. 26, 2016 in European Application No. 16161834.3.

* cited by examiner

*Primary Examiner* — Nathan Empie
(74) *Attorney, Agent, or Firm* — Snell & Wilmer, L.L.P

(57) ABSTRACT

The present disclosure includes carbon-carbon composite articles having multiphase glass oxidation protection coatings for limiting thermal and/or catalytic oxidation reactions and methods for applying multiphase glass oxidation protection coatings to carbon-carbon composite articles.

6 Claims, 3 Drawing Sheets

MULTIPHASE COMPOSITIONS FOR OXIDATION PROTECTION OF COMPOSITE ARTICLES

FIELD OF INVENTION

The present disclosure related generally to carbon-carbon composites and, more specifically, to multiphase oxidation protection systems for carbon-carbon composite components.

BACKGROUND OF THE INVENTION

Oxidation protection systems for carbon-carbon composites are typically designed to minimize loss of carbon material due to oxidation at operating conditions, which include temperatures as high as 900° C. (1652° F.). Phosphate-based oxidation protection systems may reduce infiltration of oxygen and oxidation catalysts into the composite. However, despite the use of such oxidation protection systems, significant oxidation of the carbon-carbon composites may still occur during operation of components such as, for example, aircraft braking systems.

SUMMARY OF THE INVENTION

An article in accordance with various embodiments may comprise a carbon-carbon composite structure and a multiphase oxidation protection composition including a first glass phase and a second glass phase on an outer surface of the carbon-carbon composite structure, wherein the first glass phase comprises a phosphate glass composition having a first transition temperature, and wherein the second glass phase comprises a second transition temperature higher than the first transition temperature. The second transition temperature may be at least 100° C. higher than the first transition temperature. The second glass phase may comprise a sealing glass. The first glass phase may be represented by the formula $a(A'_2O)_x(P_2O_5)_{y1}b(G_fO)_{y2}c(A''O)_z$: A' is selected from: lithium, sodium, potassium, rubidium, cesium, and mixtures thereof; $G_f$ is selected from: boron, silicon, sulfur, germanium, arsenic, antimony, and mixtures thereof; A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof; a is a number in the range from 1 to about 5; b is a number in the range from 0 to about 10; c is a number in the range from 0 to about 30; x is a number in the range from about 0.050 to about 0.500; $y_1$ is a number in the range from about 0.040 to about 0.950; $y_2$ is a number in the range from 0 to about 0.20; and z is a number in the range from about 0.01 to about 0.5; $(x+y_1+y_2+z)=1$; and $x<(y_1+y_2)$. The first glass phase may comprise between about 5 mol % and about 15 mol % of ammonium dihydrogen phosphate. The multiphase oxidation protection composition may comprise between about 1% by weight and about 15% by weight of the second glass phase. The article may comprise a component of an aircraft wheel braking assembly.

A method for limiting oxidation in a composite structure in accordance with various embodiments may comprise mixing a first glass phase matrix with a second glass phase matrix to form a multiphase glass slurry, applying the multiphase glass slurry to an outer surface of a carbon-carbon composite structure, and heating the carbon-carbon composite structure to a temperature sufficient to adhere the multiphase glass slurry to the carbon-carbon composite structure. The first glass phase matrix may be represented by the formula $a(A'_2O)_x(P_2O_5)_{y1}b(G_fO)_{y2}c(A''O)_z$: A' is selected from: lithium, sodium, potassium, rubidium, cesium, and mixtures thereof; $G_f$ is selected from: boron, silicon, sulfur, germanium, arsenic, antimony, and mixtures thereof; A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof; a is a number in the range from 1 to about 5; b is a number in the range from 0 to about 10; c is a number in the range from 0 to about 30; x is a number in the range from about 0.050 to about 0.500; $y_1$ is a number in the range from about 0.040 to about 0.950; $y_2$ is a number in the range from 0 to about 0.20; and z is a number in the range from about 0.01 to about 0.5; $(x+y_1+y_2+z)=1$; and $x<(y_1+y_2)$ The second glass phase matrix may be a sealing glass. The method may further comprise prior to applying the multiphase glass slurry to the carbon-carbon composite structure, a pretreating composition is applied to the outer surface of the carbon-carbon composite structure, the pretreating composition comprising at least one of a phosphoric acid, an acid phosphate salt, an aluminum salt, and an additional salt, the carbon-carbon composite structure being porous, and the pretreating composition penetrating at least some of a plurality of pores of the carbon-carbon composite structure. The step of applying the multiphase glass slurry on the outer surface of the carbon-carbon composite structure may comprise spraying or brushing the multiphase glass slurry on the carbon-carbon composite structure. The first glass phase matrix may comprise between about 5% by weight and about 15% by weight of ammonium dihydrogen phosphate. The carbon-carbon composite structure may comprise a component of an aircraft wheel braking assembly. The multiphase glass slurry may comprise between about 1% by weight and about 15% by weight of the second glass phase matrix

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1A:
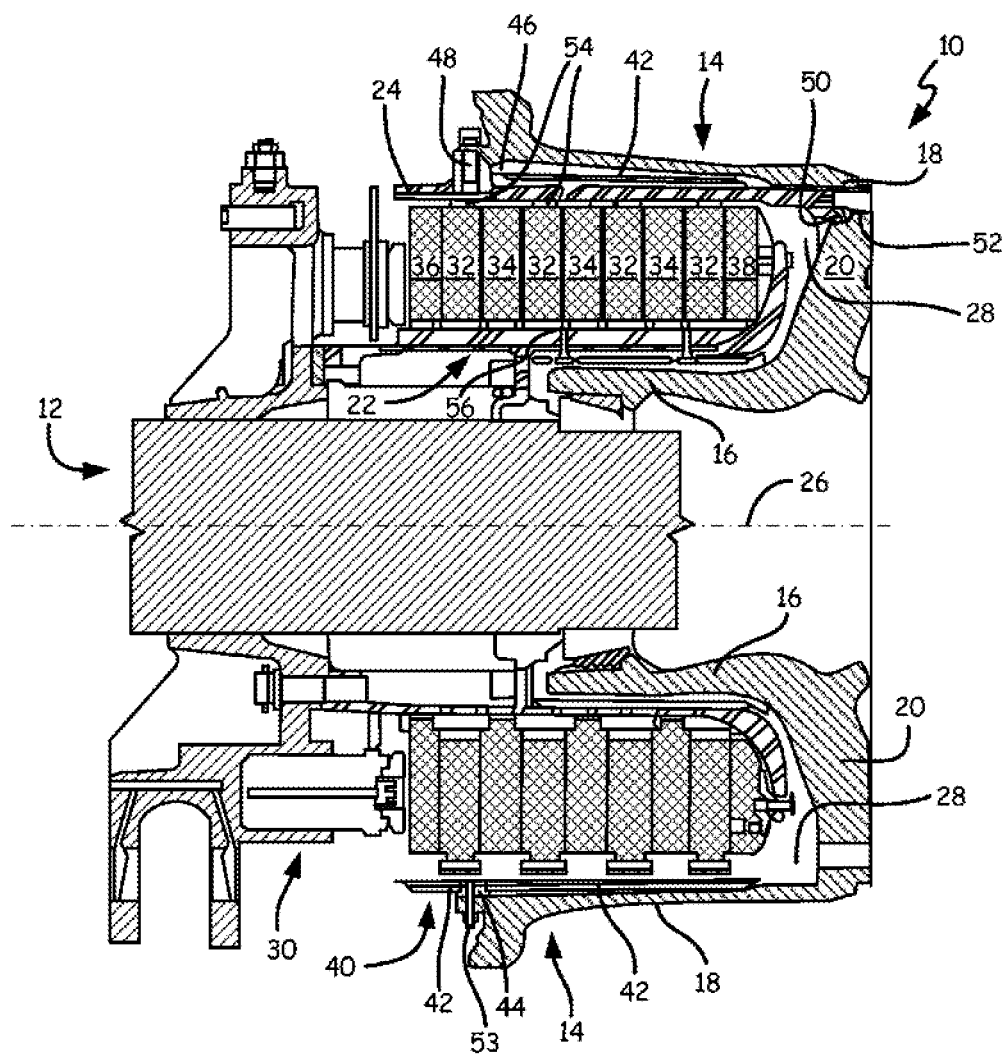
FIG. 1A illustrates a cross sectional view of an aircraft wheel braking assembly, in accordance with various embodiments.
Figure 1B:
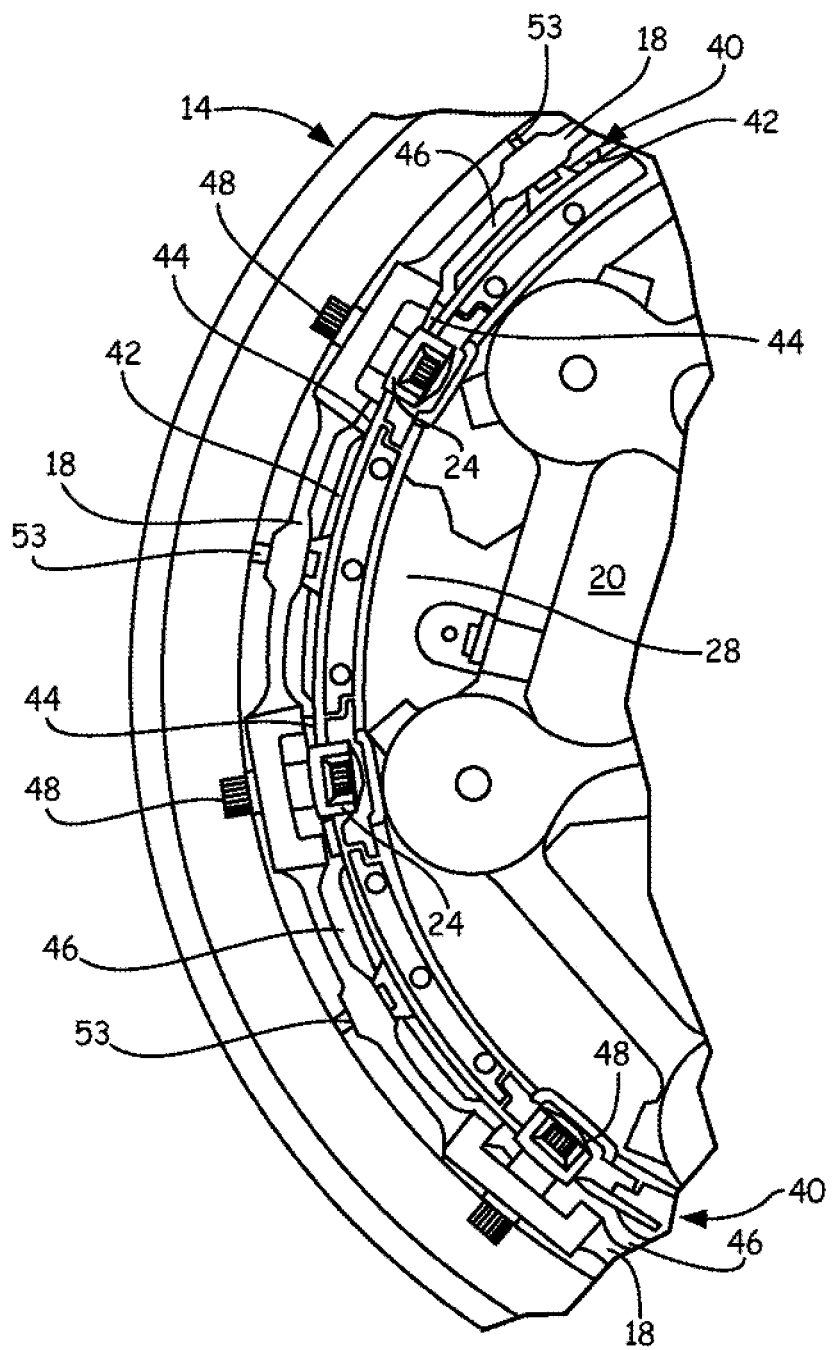
FIG. 1B illustrates a partial side view of an aircraft wheel braking assembly, in accordance with various embodiments.

With initial reference to FIGS. 1A and 1B, an aircraft wheel braking assembly 10 in accordance with various embodiments is illustrated. Aircraft wheel braking assembly may, for example, comprise a bogie axle 12, a wheel 14 including a hub 16 and a wheel well 18, a web 20, a torque take-out assembly 22, one or more torque bars 24, a wheel rotational axis 26, a wheel well recess 28, an actuator 30, multiple brake rotors 32, multiple brake stators 34, a pressure plate 36, an end plate 38, a heat shield 40, multiple heat shield segments 42, multiple heat shield carriers 44, an air gap 46, multiple torque bar bolts 48, a torque bar pin 50, a wheel web hole 52, multiple heat shield fasteners 53, multiple rotor lugs 54, and multiple stator slots 56. FIG. 1B illustrates a portion of wheel braking assembly 10 as viewed into wheel well 18 and wheel well recess 28.

In various embodiments, the various components of wheel braking assembly 10 may be subjected to the application of compositions and methods for protecting the components from oxidation.

Brake disks (e.g., brake rotors 32 and stators 34) are disposed in wheel well recess 28 of wheel well 18. Rotors 32 are secured to torque bars 24 for rotation with wheel 14, while stators 34 are engaged with torque take-out assembly 22. At least one actuator 30 is operable to compress rotors 32 and stators 34 for stopping the aircraft. In this example, actuator 30 is shown as a hydraulically actuated piston, but many types of actuators are suitable, such as an electromechanical actuator. Pressure plate 36 and end plate 38 are disposed at opposite ends of rotors 32 and stators 34. Rotors 32 and stators 34 can comprise any material suitable for friction disks, including ceramics or carbon materials, such as a carbon/carbon composite.

Through compression of rotors 32 and stators 34 between pressure plate 36 and end plate 38, the resulting frictional contact slows rotation of wheel 14. Torque take-out assembly 22 is secured to a stationary portion of the landing gear truck such as a bogie beam or other landing gear strut, such that torque take-out assembly 22 and stators 34 are prevented from rotating during braking of the aircraft.

Carbon-carbon composites in the friction disks may operate as a heat sink to absorb large amounts of kinetic energy converted to heat during slowing of the aircraft. Heat shield 40 may reflect thermal energy away from wheel well 18 and back toward rotors 32 and stators 34. With reference to FIG. 1A, a portion of wheel well 18 and torque bar 24 is removed to better illustrate heat shield 40 and heat shield segments 42. With reference to FIG. 1B, heat shield 40 is attached to wheel 14 and is concentric with wheel well 18. Individual heat shield segments 42 may be secured in place between wheel well 18 and rotors 32 by respective heat shield carriers 44 fixed to wheel well 18. Air gap 46 is defined annularly between heat shield segments 42 and wheel well 18.

Torque bars 24 and heat shield carriers 44 can be secured to wheel 14 using bolts or other fasteners. Torque bar bolts 48 can extend through a hole formed in a flange or other mounting surface on wheel 14. Each torque bar 24 can optionally include at least one torque bar pin 50 at an end opposite torque bar bolts 48, such that torque bar pin 50 can be received through wheel web hole 52 in web 20. Heat shield segments 42 and respective heat shield carriers 44 can then be fastened to wheel well 18 by heat shield fasteners 53.

Under the operating conditions (e.g., high temperature) of wheel braking assembly 10, carbon-carbon composites may be prone to material loss from oxidation of the carbon matrix. For example, various carbon-carbon composite components of wheel braking assembly may experience both catalytic oxidation and inherent thermal oxidation caused by heating the composite during operation. In various embodiments, composite rotors 32 and stators 34 may be heated to sufficiently high temperatures that may oxidize the carbon surfaces exposed to air. At elevated temperatures, infiltration of air and contaminants may cause internal oxidation and weakening, especially in and around brake rotor lugs 54 or stator slots 56 securing the friction disks to the respective torque bar 24 and torque take-out assembly 22. Because carbon-carbon composite components of wheel braking assembly 10 may retain heat for a substantial time period after slowing the aircraft, oxygen from the ambient atmosphere may react with the carbon matrix and/or carbon fibers to accelerate material loss. Further, damage to brake components may be caused by the oxidation enlargement of cracks around fibers or enlargement of cracks in a reaction-formed porous barrier coating (e.g., a silicon-based barrier coating) applied to the carbon-carbon composite.

Elements identified in severely oxidized regions of carbon-carbon composite brake components include potassium (K) and sodium (Na). These alkali contaminants may come into contact with aircraft brakes as part of cleaning or de-icing materials. Other sources include salt deposits left from seawater or sea spray. These and other contaminants (e.g. Ca, Fe, etc.) can penetrate and leave deposits in pores of carbon-carbon composite aircraft brakes, including the substrate and any reaction formed porous barrier coating. When such contamination occurs, the rate of carbon loss by oxidation can be increased by one to two orders of magnitude.

In various embodiments, components of wheel braking assembly 10 may reach operating temperatures in the range from about 100° C. (212° F.) up to about 900° C. (1652° F.), wherein in this context, the term "about" means+/−10° C. However, it will be recognized that the oxidation protection compositions and methods of the present disclosure may be readily adapted to many parts in this and other braking assemblies, as well as to other carbon-carbon composite articles susceptible to oxidation losses from infiltration of atmospheric oxygen and/or catalytic contaminants.

Figure 2:
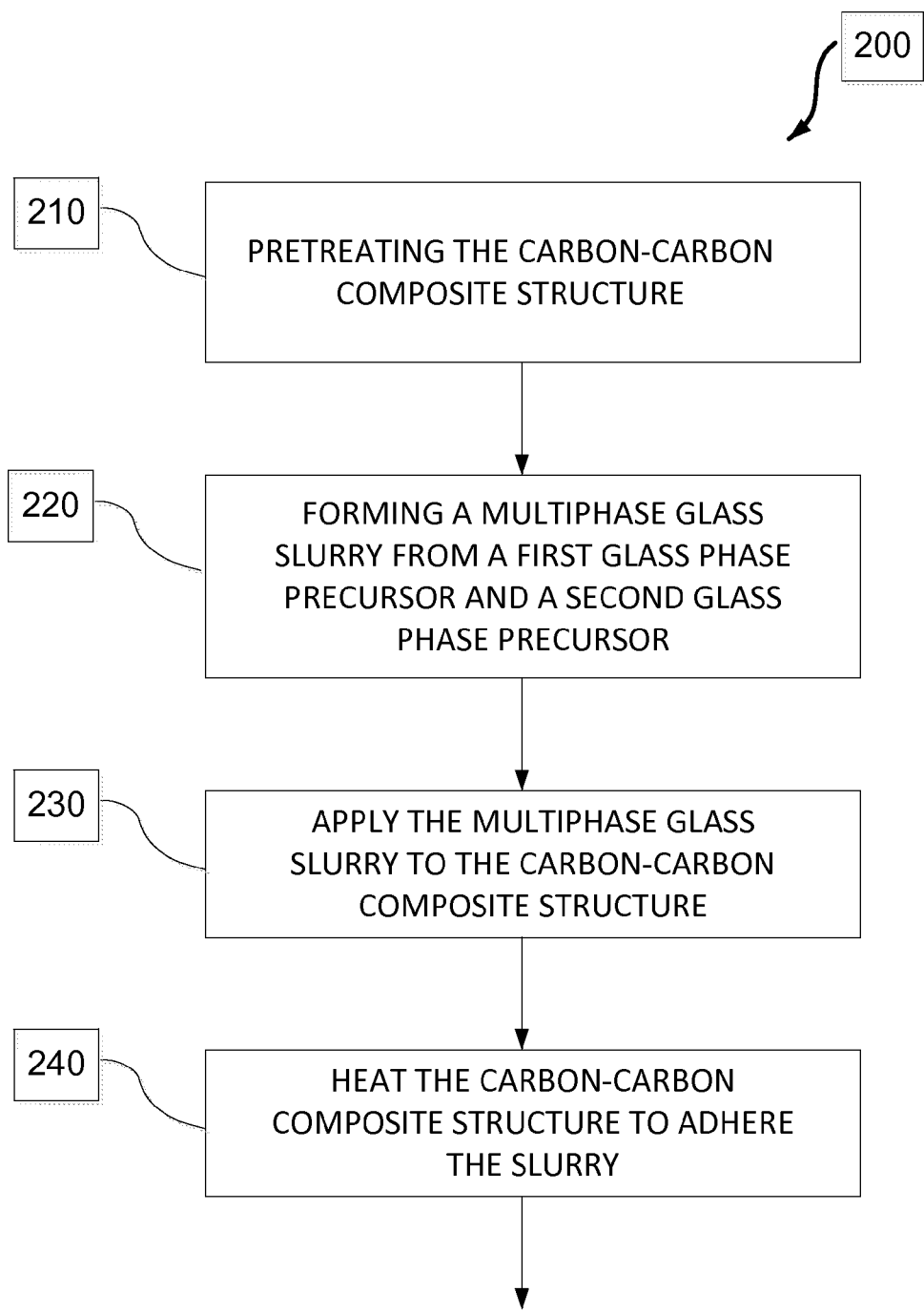
FIG. 2 illustrates a method for liming a catalytic oxidation reaction in a composite substrate in accordance with various embodiments.

With initial reference to FIG. 2, a method 200 for liming a catalytic oxidation reaction in a composite substrate in accordance with various embodiments is illustrated. Method 200 may, for example, comprise forming a multiphase glass composition and applying the composition to non-wearing surfaces of carbon-carbon composite brake components. In various embodiments, method 200 may be used on the back face of end plates 36, 38, an inner diameter (ID) surface of stators 34 including slots 56, as well as outer diameter (OD) surfaces of rotors 32 including lugs 54. The multiphase glass composition of method 200 may be applied to preselected regions of a carbon-carbon composite that may be otherwise susceptible to oxidation. For example, aircraft brake disks may have the multiphase glass composition applied on or proximate stator slots 56 and/or rotor lugs 54.

In various embodiments, method 200 may comprise an optional pretreatment step 210. Step 210 may, for example, comprise applying a first pretreating composition to the outer surface of a carbon-carbon composite, such as a component of aircraft wheel braking assembly 10. In various embodiments, the first pretreating composition comprises an aluminum oxide in water. For example, the aluminum oxide may comprise an additive, such as a nanoparticle dispersion of aluminum oxide (for example, NanoBYK-3600®, sold by BYK Additives & Instruments). The first pretreating composition may further comprise a surfactant or a wetting agent. The carbon-carbon composite may be porous, allowing the pretreating composition to penetrate at least some of the pores of the carbon-carbon composite.

In various embodiments, after applying the first pretreating composition, the component is heated to remove water and fix the aluminum oxide in place. For example, the component may be heated between about 100° C. (212° F.) and 200° C., and further, between 100° C. (212° F.) and 150° C. (392° F.).

Pretreatment step 210 may further comprise applying a second pretreating composition. In various embodiments, the second pretreating composition comprises a phosphoric acid and an aluminum phosphate, aluminum hydroxide, or aluminum oxide. The second pretreating composition may further comprise, for example, a second metal salt such as a magnesium salt. Further, the second pretreating composition may also comprise a surfactant or a wetting agent. In various embodiments, the second pretreating composition is applied to the component atop the first pretreating composition. The component may then, for example, be heated. In various embodiments, the component may be heated between about 600° C. (1112° F.) and about 800° C. (1472° F.), and further, between about 650° C. (1202° F.) and 750° C. (1382° F.).

Method 200 may further comprise, for example, a step 220 of forming a multiphase glass slurry from a first glass phase matrix and a second glass phase matrix. In various embodiments, step 220 comprises combining the first glass phase matrix and the second glass phase matrix with a carrier fluid (such as, for example, water) to form the multiphase glass slurry. To prepare the first glass phase matrix and the second glass phase matrix, one or both may be crushed or pulverized to form powders or frits. The pulverized first glass phase matrix and/or pulverized second glass phase matrix may be combined with the carrier fluid to form the multiphase glass slurry.

The first glass matrix may, for example, comprise an acidic phosphate glass based on, for example, phosphorus pentoxide ($P_2O_5$). In various embodiments, the first glass phase matrix may comprise one or more alkali metal glass modifiers, one or more glass network modifiers and/or one or more additional glass formers. Further, boron oxide or a precursor may optionally be combined with the $P_2O_5$ mixture to form a borophosphate glass, which has improved self-healing properties at the operating temperatures typically seen in aircraft braking assemblies. In various embodiments, the phosphate glass and/or borophosphate glass may be characterized by the absence of an oxide of silicon. Further, the ratio of $P_2O_5$ to metal oxide in the fused glass may be in the range from about 0.25 to about 5.

Potential alkali metal glass modifiers may be selected from oxides of lithium, sodium, potassium, rubidium, cesium, and mixtures thereof. In certain embodiments, the glass modifier may be an oxide of lithium, sodium, potassium, or mixtures thereof. These or other glass modifiers may function as fluxing agents. Additional glass formers can include oxides of boron, silicon, sulfur, germanium, arsenic, antimony, and mixtures thereof. Further, in various embodiments, the first glass phase matrix may also comprise ammonium dihydrogen phosphate or monobasic ammonium phosphate.

Suitable glass network modifiers include oxides of vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof.

The first glass phase matrix may be prepared by combining the above ingredients and heating them to a fusion temperature. In certain embodiments, depending on the particular combination of elements, the fusion temperature can be in the range from about 700° C. (1292° F.) to about 1500° C. (2732° F.), wherein in this context, the term "about" means +/−10° C. The melt may then be cooled and pulverized to form the frit. In various embodiments, the first glass phase matrix may be annealed to a rigid, friable state prior to being pulverized. Glass transition temperature ($T_g$), glass softening temperature ($T_s$) and glass melting temperature ($T_m$) may be increased by increasing refinement time and/or temperature. Before fusion, the first glass phase matrix comprises from about 20 mol % to about 80 mol % of $P_2O_5$, wherein the term "about" means +/−0.5 mol %. In various embodiments, the first glass phase matrix comprises from about 30 mol % to about 70 mol % $P_2O_5$, or precursor thereof. In various embodiments, the first glass phase matrix comprises from about 40 to about 60 mol % of $P_2O_5$. The first glass phase matrix can comprise from about 5 mol % to about 50 mol % of the alkali metal oxide. In various embodiments, the first glass phase matrix comprises from about 10 mol % to about 40 mol % of the alkali metal oxide. Further, the first phosphate glass composition matrix comprises from about 15 to about 30 mol % of the alkali metal oxide or one or more precursors thereof. In various embodiments, the first glass phase matrix can comprise from about 0.5 mol % to about 50 mol % of one or more of the above-indicated glass formers. The first glass phase matrix may comprise about 5 to about 20 mol % of one or more of the above-indicated glass formers.

In various embodiments, the first glass phase matrix can comprise from about 0.5 mol % to about 40 mol % of one or more of the above-indicated glass network modifiers. The first glass phase matrix may comprise from about 2.0 mol % to about 25 mol % of one or more of the above-indicated glass network modifiers.

In various embodiments, the first glass phase matrix may represented by the formula:

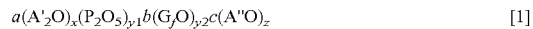

$$a(A'_2O)_x(P_2O_5)_{y1}b(G_fO)_{y2}c(A''O)_z \quad [1]$$

In Formula 1, A' is selected from: lithium, sodium, potassium, rubidium, cesium, and mixtures thereof. $G_f$ is selected from: boron, silicon, sulfur, germanium, arsenic, antimony, and mixtures thereof. A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof a is a number in the range from 1 to about 5. b is a number in the range from 0 to about 10. c is a number in the range from 0 to about 30. x is a number in the range from about 0.050 to about 0.500. $y_1$ is a number in the range from about 0.040 to about 0.950. $y_2$ is a number in the range from 0 to about 0.20. z is a number in the range from about 0.01 to about 0.5. In addition, with regard to the individual variables, $(x+y_1+y_2+z)=1$, and $x<(y_1+y_2)$. The first glass phase matrix may be formulated to balance the reactivity, durability and flow of the resulting multiphase slurry for optimal performance.

In various embodiments, the second glass phase matrix may be a sealing glass, such as the sealing glasses described in Table 1 below.

TABLE 1

| Second Glass Phase Matrix | Density (g/cc) | Soft. Pt. (° C.) | CTE (ppm/° C.) | $T_g$ (° C.) | $T_s$ (° C.) |
|---|---|---|---|---|---|
| A | 2.99 | 395 | 21.6 | 318 | 348 |
| B | 6.79 | 408 | 10.5 | 324 | 455 |
| C | 2.96 | 422 | 20.0 | 350 | 380 |
| D | 5.73 | 490 | 8.2 | 411 | 452 |
| E | 2.34 | 590 | 9.4 | 465 | N/A |
| F | 3.32 | 622 | 5.8 | 460 | 524 |
| G | 2.61 | 639 | 9.3 | 487 | 537 |
| H | 3.14 | 648 | 4.0 | 539 | 598 |
| I | 2.59 | 654 | 10.0 | 481 | 559 |
| J | 3.03 | 658 | 8.7 | 589 | 625 |
| K | 2.25 | 673 | 5.7 | 577 | 629 |
| L | 2.41 | 680 | 5.0 | 505 | N/A |
| M | 2.66 | 699 | 7.2 | 613 | 635 |
| N | 2.91 | 717 | 3.1 | 575 | 620 |
| O | 2.33 | 717 | 4.3 | N/A | N/A |
| P | 2.34 | 719 | 4.7 | 544 | 613 |
| Q | 2.55 | 726 | 5.9 | 650 | 696 |
| R | 2.72 | 862 | 5.2 | 717 | 784 |

For example, the second glass phase matrix may comprise one of glass matrices A-R of Table 1. In various embodiments, the second glass phase matrix comprises a sealing glass having a glass transition temperature higher than the first glass phase matrix. For example, the glass transition temperature of the second glass phase matrix may be at least about 100° C. higher than the glass transition temperature of the first glass phase matrix.

As illustrated in Table 2 below, in various embodiments, the multiphase glass slurry may comprise a greater amount of the first glass phase matrix than the second glass phase matrix.

TABLE 2

Weight % of Various Components of Various Multiphase Glass Slurries

| Component | MP1 | MP2 | MP3 | MP4 | MP5 |
|---|---|---|---|---|---|
| First Glass Phase Matrix | 35 | 35 | 35 | 35 | 35 |
| Second Glass Phase Matrix | 1 | 1 | 1 | 2 | 4 |
| Ammonium Dihydrogen Phosphate | 10 | 10 | 10 | 10 | 10 |
| Water | 50 | 50 | 50 | 50 | 50 |

In various embodiments, the amount of second glass phase matrix in the multiphase glass slurry may vary from about 1% by weight to about 15% by weight. Further, in various embodiments, the multiphase glass slurry may comprise between about 5% by weight and about 15% by weight of ammonium dihydrogen phosphate. In this context, "about" means+/−0.5% by weight The multiphase glass slurry offers improved oxidation protection over prior art oxidation protection systems. For example, the difference between the first transition temperature (of the first glass phase) and the second transition temperature (of the second glass phase) may provide enhanced resistance to migration at high temperatures, which in turn may reduce oxidation damage to the carbon-carbon composite structure.

In various embodiments, method 200 further comprises a step 230 of applying the multiphase glass slurry to the carbon-carbon composite structure. Step 230 may comprise, for example, spraying or brushing the multiphase glass slurry on to the outer surface of the carbon-carbon composite structure. In various embodiments, step 230 may comprise applying the multiphase glass slurry on to the outer surface of the carbon-carbon composite structure via chemical vapor deposition. Any suitable manner of applying the multiphase glass slurry to the carbon-carbon composite is within the scope of the present disclosure.

In various embodiments, method 200 further comprises a step 240 of heating the carbon-carbon composite structure to adhere the multiphase glass slurry to the carbon-carbon composite structure. The treated carbon-carbon composite may be heated (e.g., dried or baked) at a temperature in the range from about 200° C. (392° F.) to about 1000° C. (1832° F.), wherein the term "about" means+/−10° C. In various embodiments, the composite is heated to a temperature in a range from about 600° C. (1112° F.) to about 1000° C. (1832° F.), or between about 200° C. (392° F.) to about 900° C. (1652° F.), or further, between about 400° C. (752° F.) to about 850° C. (1562° F.).

Step 240 may, for example, comprise heating the carbon-carbon composite structure for a period between about 0.5 hour and about 8 hours, wherein in this context, "about" means+/−0.5 hours.

In various embodiments, the composite may be heated to a first, lower temperature (for example, about 30° C. (86° F.) to about 300° C. (572° F.), wherein the term "about" means+/−10° C.) to bake or dry the multiphase glass slurry at a controlled depth. A second, higher temperature (for example, about 300° C. (572° F.) to about 1000° C. (1832° F.)) may then be used to form a deposit from the base layer within the pores of the carbon-carbon composite. The duration of each heating step can be determined as a fraction of the overall heating time and can range from about 10% to about 50%. In various embodiments, the duration of the lower temperature heating step(s) can range from about 20% to about 40% of the overall heating time. The lower temperature step(s) may occupy a larger fraction of the overall heating time, for example, to provide relatively slow heating up to and through the first lower temperature. The exact heating profile will depend on a combination of the first temperature and desired depth of the drying portion.

Step 240 may be performed in an inert or substantially environment, such as under a blanket of inert gas (e.g., nitrogen, argon, and the like). For example, a carbon-carbon composite may be pretreated or warmed prior to application of the multiphase glass slurry to aid in the penetration of the slurry. Step 240 may be for a period of about 2 hours at a temperature of about 750° C. (1382° F.) to about 800° C. (1472° F.), wherein the term "about" means+/−10° C. The carbon-carbon composite and multiphase glass slurry may then be dried or baked in a non-oxidizing, inert atmosphere, e.g., nitrogen ($N_2$), to optimize the retention of the multiphase glass slurry in the pores. This retention may, for example, be improved by heating the carbon-carbon composite to about 200° C. (392° F.) and maintaining the temperature for about 1 hour before heating the carbon-carbon composite to a temperature in the range described above. The temperature rise may be controlled at a rate that removes water without boiling, and provides temperature uniformity throughout the carbon-carbon composite.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for limiting an oxidation reaction in a composite substrate, comprising:
    mixing a first glass phase matrix with a second glass phase matrix to form a multiphase glass slurry, wherein the second glass phase matrix has a second glass transition temperature that is at least 100 degrees Celsius higher than a first glass transition temperature of the first glass phase matrix; wherein the second glass phase matrix comprises at least one of: a first sealing glass having a density of 2.99 grams per cubic centimeter (g/cc), a softening point of 395° C., a coefficient of thermal expansion of 21.6 ppm/° C., and a glass transition temperature of 318° C.; a second sealing glass having a density of 6.79 g/cc, a softening point of 408° C., a coefficient of thermal expansion of 10.5 ppm/° C., and a glass transition temperature of 324° C.; a third sealing glass having a density of 2.96 g/cc, a softening point of 422° C., a coefficient of thermal expansion of 20 ppm/° C., and a glass transition temperature of 350° C.; a fourth sealing glass having a density of 5.73 g/cc, a softening point of 490° C., a coefficient of thermal expansion of 8.2 ppm/° C., and a glass transition temperature of 411° C.; a fifth sealing glass having a density of 2.34 g/cc, a softening point of 590° C., a coefficient of thermal expansion of 9.4 ppm/° C., and a glass transition temperature of 465° C.; a sixth sealing glass having a density of 3.32 g/cc, a softening point of 622° C., a coefficient of thermal expansion of 5.8 ppm/° C., and a glass transition temperature of 460° C.; a seventh sealing glass having a density of 2.61 g/cc, a softening point of 639° C., a coefficient of thermal expansion of 9.3 ppm/° C., and a glass transition temperature of 487° C.; an eighth sealing glass having a density of 3.14 g/cc, a softening point of 648° C., a coefficient of thermal expansion of 4 ppm/° C., and a glass transition temperature of 539° C.; a ninth sealing glass having a density of 2.59 g/cc, a softening point of 654° C., a coefficient of thermal expansion of 10 ppm/° C., and a glass transition temperature of 481° C.; a tenth sealing glass having a density of 3.03 g/cc, a softening point of 658° C., a coefficient of thermal expansion of 8.7 ppm/° C., and a glass transition temperature of 589° C.; an eleventh sealing glass having a density of 2.25 g/cc, a softening point of 673° C., a coefficient of thermal expansion of 5.7 ppm/° C., and a glass transition temperature of 577° C.; a twelfth sealing glass having a density of 2.41 g/cc, a softening point of 680° C., a coefficient of thermal expansion of 5 ppm/° C., and a glass transition temperature of 505° C.; a thirteenth sealing glass having a density of 2.66 g/cc, a softening point of 699° C., a coefficient of thermal expansion of 7.2 ppm/° C., and a glass transition temperature of 613° C.; a fourteenth sealing glass having a density of 2.91 g/cc, a softening point of 717° C., a coefficient of thermal expansion of 3.1 ppm/° C., and a glass transition temperature of 575° C.; a fifteenth sealing glass having a density of 2.33 g/cc, a softening point of 717° C., and a coefficient of thermal expansion of 4.3 ppm/° C.; a sixteenth sealing glass having a density of 2.34 g/cc, a softening point of 719° C., a coefficient of thermal expansion of 4.7 ppm/° C., and a glass transition temperature of 544° C.; a seventeenth sealing glass having a density of 2.55 g/cc, a softening point of 726° C., a coefficient of thermal expansion of 5.9 ppm/° C., and a glass transition temperature of 650° C.; or an eighteenth sealing glass having a density of 2.72 g/cc, a softening point of 862° C., a coefficient of thermal expansion of 5.2 ppm/° C., and a glass transition temperature of 717° C.; applying the multiphase glass slurry to an outer surface of a carbon-carbon composite structure; and
    heating the carbon-carbon composite structure to a temperature sufficient to adhere the multiphase glass slurry to the carbon-carbon composite structure.

2. The method of claim 1, wherein the first glass phase matrix is represented by the formula $a(A'_2O)_x(P_2O_5)_{y1}b(G_fO)_{y2}c(A''O)_z$:

A' is selected from: lithium, sodium, potassium, rubidium, cesium, and mixtures thereof;

$G_f$ is selected from: boron, silicon, sulfur, germanium, arsenic, antimony, and mixtures thereof;

A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof;

a is a number in the range from 1 to about 5;
b is a number in the range from 0 to about 10;
c is a number in the range from 0 to about 30;
x is a number in the range from about 0.050 to about 0.500;
$y_1$ is a number in the range from about 0.040 to about 0.950;
$y_2$ is a number in the range from 0 to about 0.20; and
z is a number in the range from about 0.01 to about 0.5;
$(x+y_1+y_2+z)=1$; and
$x<(y_1+y_2)$.

3. The method of claim 1, wherein prior to applying the multiphase glass slurry to the carbon-carbon composite structure, a first pretreating composition is applied to the outer surface of the carbon-carbon composite structure, the first pretreating composition comprising an aluminum oxide and water and an optional surfactant.

4. The method of claim 3, wherein after applying the first pretreating composition to the outer surface of the carbon-carbon composite structure, the carbon-carbon structure is heated, and wherein after heating the carbon-carbon structure, a second pretreating composition comprising a phosphoric acid, one of an aluminum phosphate, an aluminum hydroxide, and an aluminum oxide, and a metal salt is applied to an outer surface of the first pretreating composition, wherein the carbon-carbon composite structure is porous and the second pretreating composition penetrates at least some of a plurality of pores of the carbon-carbon composite structure.

5. The method of claim 2, wherein the multiphase glass slurry comprises between about 5% by weight and about 15% by weight of ammonium dihydrogen phosphate.

6. The method of claim 1, wherein the multiphase glass slurry comprises between about 1% by weight and about 15% by weight of the second glass phase matrix.

* * * * *